United States Patent [19]

Aoki

[11] Patent Number: 4,852,037
[45] Date of Patent: Jul. 25, 1989

[54] ARITHMETIC UNIT FOR CARRYING OUT BOTH MULTIPLICATION AND ADDITION IN AN INTERVAL FOR THE MULTIPLICATION

[75] Inventor: Hiromichi Aoki, Tokyo, Japan

[73] Assignee: NEC Corporation, Japan

[21] Appl. No.: 85,874

[22] Filed: Aug. 13, 1987

[30] Foreign Application Priority Data

Aug. 16, 1986 [JP] Japan ........................... 61-191934

[51] Int. Cl.[4] ............................................. G06F 7/544
[52] U.S. Cl. .................................... 364/736; 364/758
[58] Field of Search ............... 364/758, 736, 757, 759, 364/760, 754

[56] References Cited

U.S. PATENT DOCUMENTS

| | | | |
|---|---|---|---|
| 4,156,922 | 5/1979 | Majerski et al. | 364/757 |
| 4,215,419 | 7/1980 | Majerski | 364/760 |
| 4,337,519 | 6/1982 | Nishimoto | 364/736 |
| 4,546,446 | 10/1985 | Machida | 364/759 |
| 4,594,678 | 6/1986 | Uhlenhoff | 364/758 X |
| 4,627,026 | 12/1986 | Di Giugno | 364/736 X |
| 4,727,507 | 2/1988 | Miyanaga | 364/760 |
| 4,752,905 | 6/1988 | Nakagawa et al. | 364/757 X |

FOREIGN PATENT DOCUMENTS 0136834 4/1985 European Pat. Off. ............ 364/736
0199044 12/1982 Japan .
0254373 12/1985 Japan .

OTHER PUBLICATIONS

Wallace, "A Suggestion for a Fast Multiplier", IEEE Trans. on Electronic Computers, Feb. 1964, pp. 14-17.

Primary Examiner—Eugene R. LaRoche
Assistant Examiner—Seung Ham
Attorney, Agent, or Firm—Laff, Whitesel, Conte & Saret

[57] ABSTRACT

In an arithmetic unit comprising a partial product circuit for calculating a plurality of partial products for two numbers and a Wallace tree responsive to the partial products for producing a plurality of tree outputs which gives a total product of the two numbers when summed up, an addend is supplied to the Wallace tree as an additional partial product. The arithmetic unit produces a resultant sum of the total product plus the addend. The addend may be supplied to the Wallace tree from one or more registers therefor. Alternatively, a result register is used for the total product with the total product supplied to the Wallace tree as the addend. As a further alternative, an additional register is used for a third number which is used with bit shifts as the addend. In this last event, the arithmetic unit preferably produces a sum selected from the resultant sum.

6 Claims, 4 Drawing Sheets

ARITHMETIC UNIT FOR CARRYING OUT BOTH MULTIPLICATION AND ADDITION IN AN INTERVAL FOR THE MULTIPLICATION

BACKGROUND OF THE INVENTION

This invention relates to an arithmetic unit for both multiplication and addition.

It has been the practice on calculating a sum of a product and an addend to successively carry out two processes of multiplication and addition. More particularly, a multiplier or multiplication circuit is used at first to carry out a multiplication process of calculating a result of multiplication. In the manner which will later be described more in detail, the multiplication circuit may comprise a partial product circuit for calculating a plurality of partial products in response to a multiplicand and a multiplier which are memorized in two registers, respectively. A Wallace tree, known in the art, may be used in producing a plurality of tree outputs in response to the partial products. Under the circumstances, an adder or totalizer is used to sum up the tree outputs into the result of multiplication which may be called a total product in discrimination from the partial products. After the total product is obtained in this manner, an adder is used in carrying out an addition process of adding the addend to the total product.

A time interval, equal to an interval for the multiplication process plus another interval for the addition process, has therefore been indispensable to get the sum of the total product and the addend. In other words, it has been impossible to get the sum in a short period of time.

SUMMARY OF THE INVENTION

It is therefore an object of the present invention to provide an arithmetic unit, with which it is possible to get a sum of a product and an addend in a short period of time.

It is another object of this invention to provide an arithmetic unit of the type described, which is capable of calculating the sum in a time interval for only a multiplication process of calculating the product.

Other objects of this invention will become clear as the description proceeds.

According to this invention, there is provided an arithmetic unit comprising: a first register for memorizing a first signal representative of a first number; a second register for memorizing a second signal representative of a second number; a partial product circuit responsive to the first and the second signals for calculating a plurality of partial products for the first and the second numbers; a Wallace tree; first means for supplying the partial products from the partial product circuit to the Wallace tree; second means for supplying an addend to the Wallace tree as an additional partial product; the Wallace tree being responsive to the above-mentioned plurality of partial products and the additional partial product for producing a plurality of tree outputs; and an adder for summing up the tree outputs into a resultant sum of a total product of the first and the second numbers plus the addend.

DESCRIPTION OF THE PREFERRED EMBODIMENTS

Figure 1:
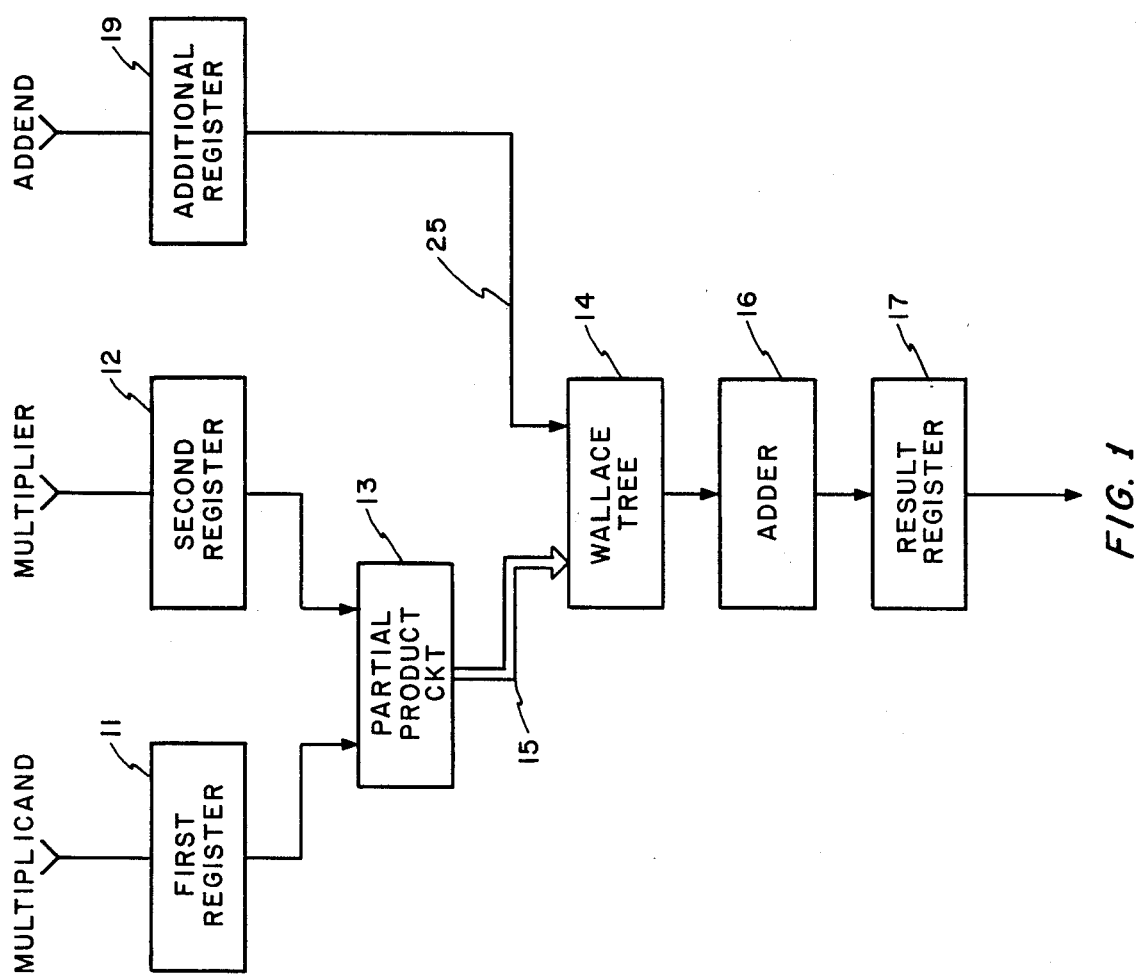
FIG. 1 is a block diagram of an arithmetic unit according to a first embodiment of the instant invention.

Referring to FIG. 1, an arithmetic unit generally comprises first and second registers 11 and 12 which are for memorizing first and second signals representative of first and second numbers. It is possible without loss of generality to regard the first and the second numbers as a multiplicand and a multiplier, respectively. Supplied with the first and the second signals, a partial product circuit 13 calculates a plurality of partial products for the first and the second numbers in the known manner, typically, according to the Booth algorithm known in the art.

Responsive to the partial products, a Wallace tree 14 produces a plurality of tree ouputs in the manner known in the art. For this purpose, a connection 15 is used in supplying the partial products from the partial product circuit 13 to the Wallace tree 14. An adder or totalizer 16 is for summing up the tree outputs into a total product of the first and the second numbers. For use in combination with the Wallace tree 14, the adder 16 should be a two-input carry look-ahead adder circuit as will soon become clear. A result register 17 is for keeping the total product for supply to a utilization device which will later be exemplified. If necessary, reference should be had as regards the Wallace tree 14 to an article which was contributed by C. S. Wallace to IEEE Transactions on Electronic Computers, February 1964, pages 14 to 17, under the title of "A Suggestion for a Fast Multiplier."

According to a first embodiment of the present invention, the arithmetic unit comprises an additional register 19 for memorizing a third signal representative of an addend which should be added to the total product to provide a resultant sum. In the example being illustrated, the third signal is delivered directly to the Wallace tree 14 as an additional partial product.

In FIG. 1, it will be presumed that the multiplicand has m bits and the multiplier, n bits. In this event, the partial products are k in number, where the number k is generally less than m although dependent on the structure of the partial product circuit 13. When used in a conventional arithmetic unit, a Wallace tree has a plurality of input terminals which are for the k partial products. In contrast, the input terminals of the Wallate tree 14 are for (k+1) partial products. Supplied with the k partial products from the partial product circuit 13 and with the additional partial product from the additional register 19, the Wallace tree 14 produces the tree outputs in the manner which will presently be exemplified. Responsive to such tree outputs, the adder or totalizer 16 suplies the result register 17 with a resultant sum which is equal to a sum of the total product and the addend.

Figure 2:
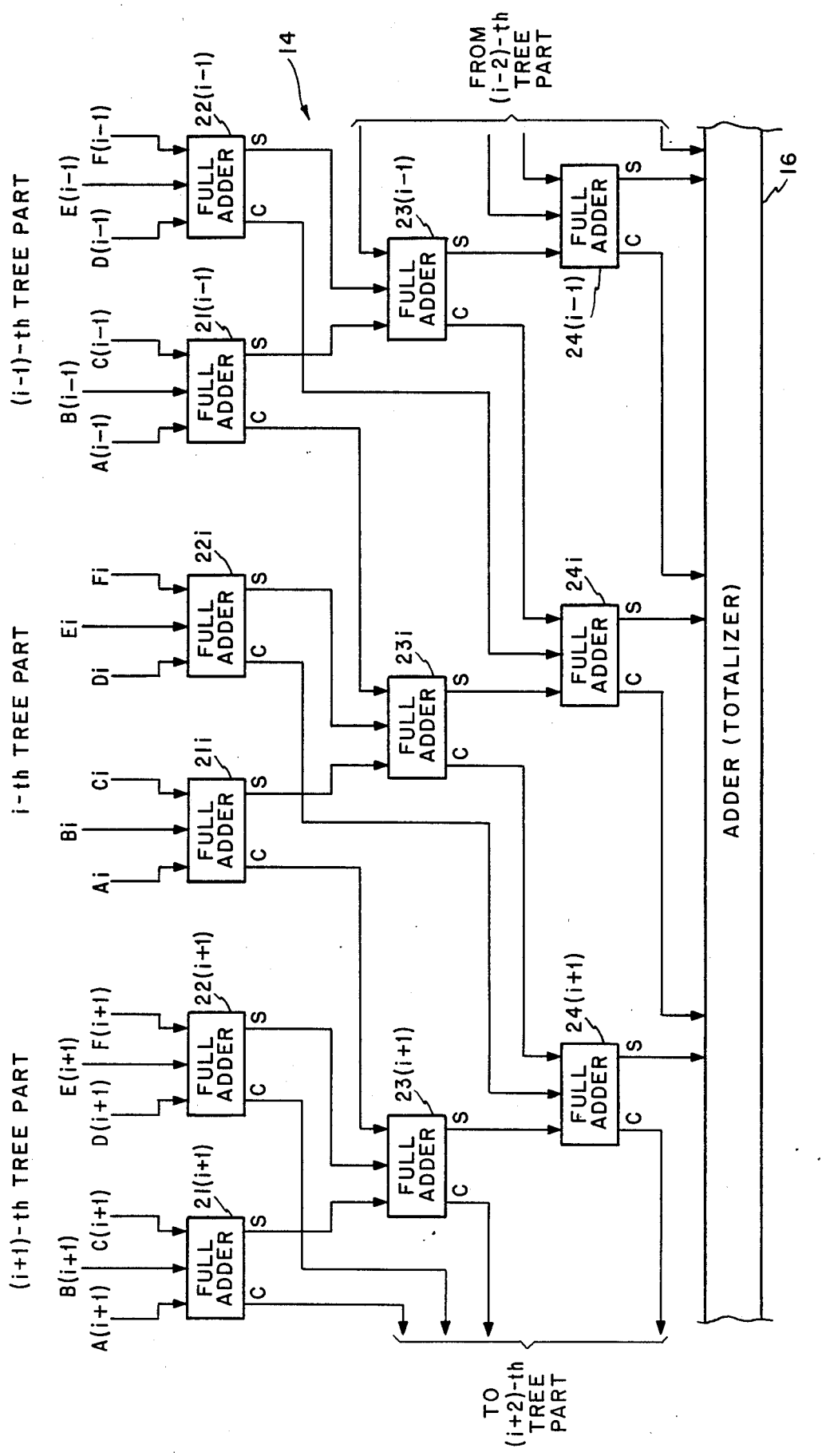
FIG. 2 is a block diagram of parts of a Wallace tree and an adder which are used in the arithmetic unit depicted in FIG. 1.

Turning to FIG. 2, it will be assumed merely for simplicity of illustration that the number k is equal to five, namely, that the partial product circuit 13 of FIG. 1 produces first through fifth partial products A, B, C, D, and E. In the manner understood from the foregoing, the addend is used as a sixth partial product F. Each partial product ordinarily has a plurality of bits or digits depending on the bits, n in number, of the multiplier, such as $(i-1)$-th, i-th, and $(i+1)$-th bits. The Wallace tree 14 comprises a plurality of tree parts, such as an i-th tree part for the i-th bits of the first through the sixth partial products A to F. For the respective bits, structural components of the Wallace tree 14 and the bits of each partial product will be designated by addition of suffixes indicative of the ordinal numbers of the bits.

Inasmuch as the i-th bits are six in number for the six partial products A through F, the i-th tree part comprises first and second full adders $21i$ and $22i$ as first-step full adders, a third full adder $23i$ as a second-step full adder, and a fourth full adder $24i$ as a third-step or last-step full adder. Similarly, the (i-1)-th tree part comprises first through fourth full adders $21(i-1)$, $22(i-1)$, $23(i-1)$, and $24(i-1)$. The $(i+1)$-th three part comprises first through fourth full adders $21(i+1)$, $22(i+1)$, $23(i+1)$, and $24(i+1)$.

The first full adder $21i$ of the i-th tree part is for i-th bits Ai, Bi, and Ci of the first through the third partial products A to C and produces a first i-th-bit sum and a first i-th-bit carry. The second full adder $22i$ is for i-th bits Di, Ei, and Fi of the fourth through the sixth partial producs D to F and produces a second i-th-bit sum and a second i-th-bit carry. The first and the second i-th-bit carries are delivered to the $(i+1)$-th tree part. Likewise, first and second $(i-1)$-th-bit carries are delivered from the $(i-1)$-th tree part to the i-th tree part. Such sums and carries are indicated in the figure by S and C.

The third full adder $23i$ of the i-th tree part is for the first and the second i-th-bit sums and the first $(i-1)$-th-bit carry and produces a third i-th-bit sum and a third i-th-bit carry. The third i-th-bit carry is delivered to the $(i+1)$-th tree part. A third $(i-1)$-th-bit carry is delivered from the $(i-1)$-th three part to the i-th tree part. The fourth full adder $24i$ is for the third i-th-bit sum and the second and the third $(i-1)$-th-bit carries and produces a fourth i-th-bit sum and a fourth i-th-bit carry. A fourth $(i-1)$-th-bit carry is likewise produced in the $(i-1)$-th tree part.

Inasmuch as the fourth full adder $24i$ is the last-step full adder in the example being illustrated, the fourth i-th-bit sum and the fourth $(i-1)$-th-bit carry are used as a pair of i-th-bit tree outputs in the adder or totalizer 16. It will now be appreciated that a combination of the Wallace tree 14 and the adder 16 produces the above-mentioned resultant sum by calculating the total product and simultaneously adding the addend to the total product. In other words, the combination calculates the resultant sum in a time interval for only a multiplication process for the total products.

Reviewing FIG. 1, the connection 15 serves as an arrangement for supplying the k partial products from the partial product circuit 13 to the Wallace tree 14. Another connection 25 is used in supplying the third signal as the addend from the additional register 19 to the Wallace tree 14. It is therefore understood that a combination of the additional register 19 and the connection 25 serves as another arrangement for supplying the addend to the Wallace tree 14.

Figure 3:
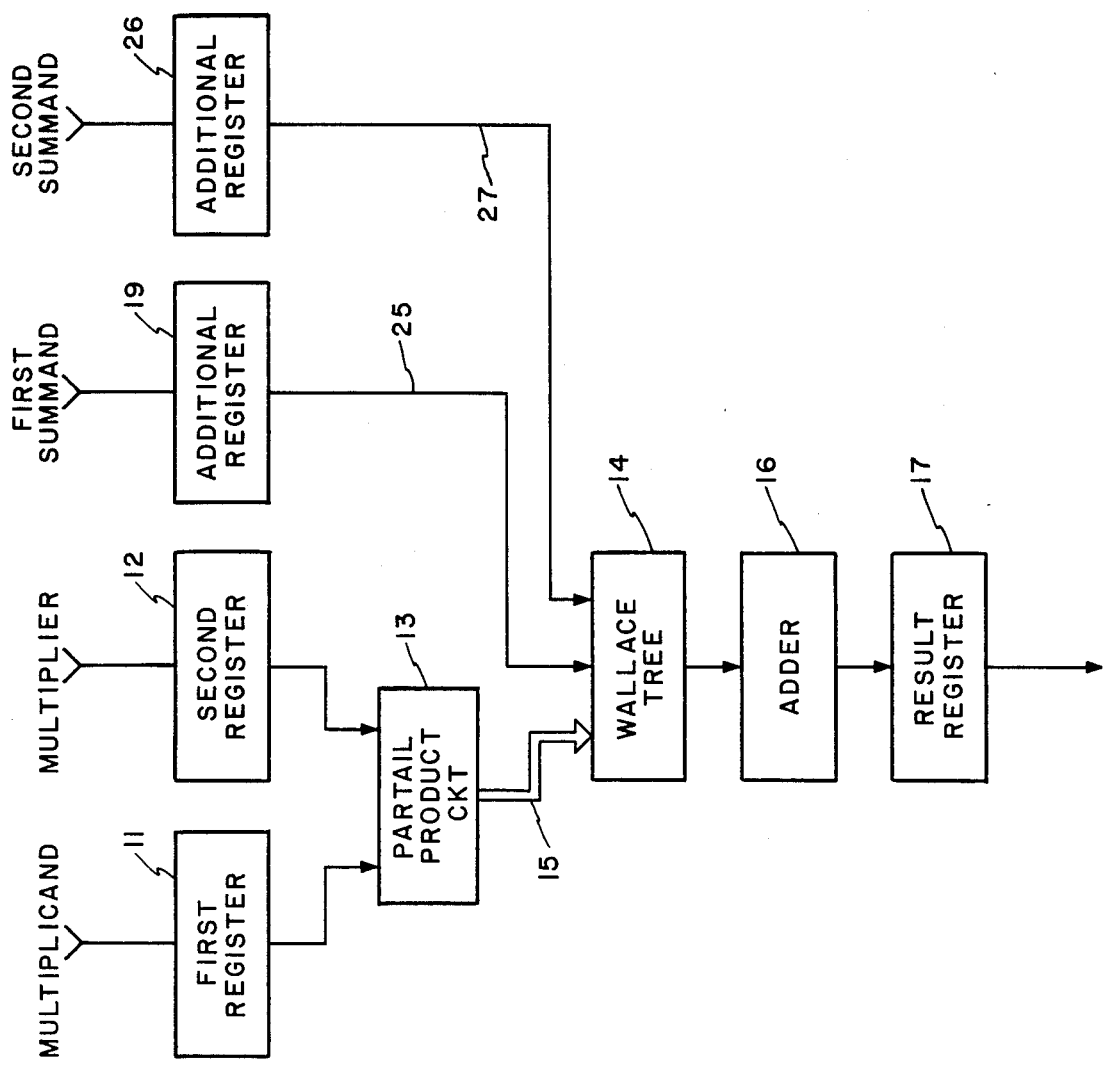
FIG. 3 is a block diagram of an arithmetic unit according to a second embodiment of this invention.

Turning to FIG. 3, description will be given in connection with an arithmetic unit according to a second embodiment of this invention. In addition to the additional register 19, the arithmetic unit comprises another additional register 26 for a fourth signal. The addend, as called heretobefore, will now be termed a first summand. The fourth signal represents a second summand.

An additional connection 27 is used in supplying the fourth signal to the Wallace tree 14 from the additional register 26. When k partial products are produced in the partial product circuit 13 in the manner described hereinabove, the Wallace tree 14 should have the input terminals for (k+2) partial products. At any rate, it is now understood that the connections 25 and 27 serve to supply the Wallace tree 14 with the first and the second summands collectively as an addend, namely, as an additional partial product. In this manner, the arithmetic unit may comprise a plurality of additional registers, each for an additional signal representative of a summand. The connections, such as 25 and 27, are for supplying the additional signals from the respective additional registers to the Wallace tree 14 collectively as an addend.

Figure 4:
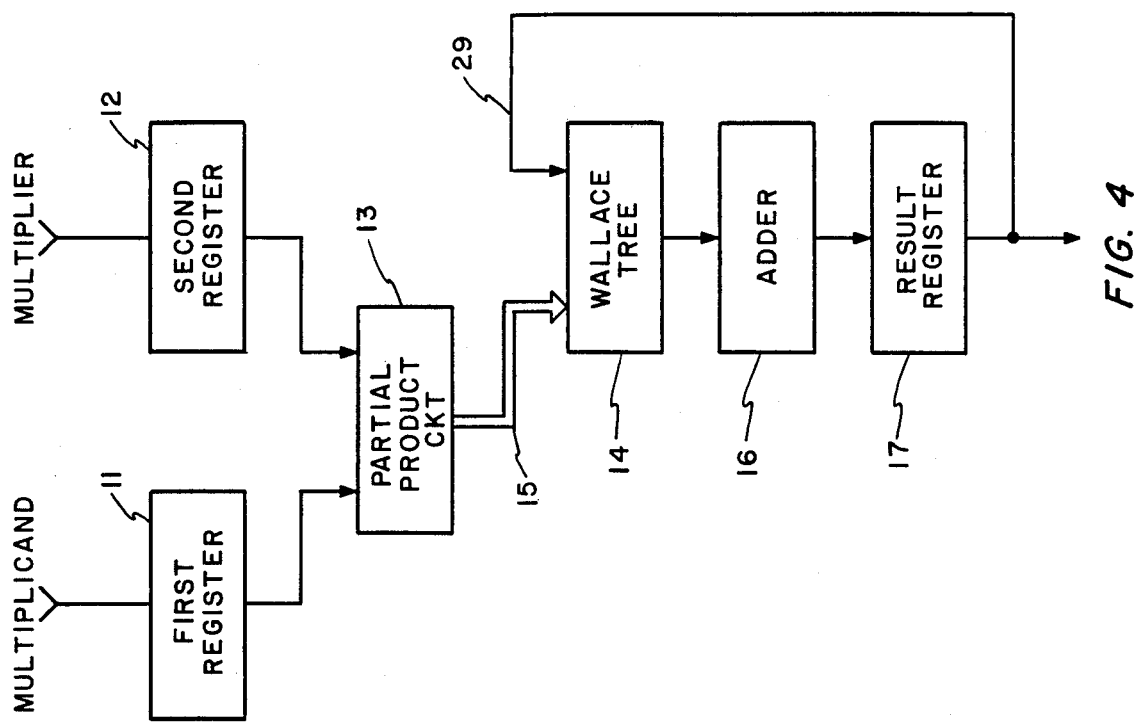
FIG. 4 is a block diagram of an arithmetic unit according to a third embodiment of this invention.

Referring now to FIG. 4, the description will proceed to an arithmetic unit according to a third embodiment of this invention. The arithmetic unit comprises similar parts which are designated by like reference numerals. The arithmetic unit, however, comprises no additional register and no connection therefor in contrast to the arithmetic units illustated with reference to FIGS. 1 and 3. Instead, the arithmetic unit comprises a different connection 29 for supplying the total product to the Wallace tree 14 as an addend or as an additional partial product.

In FIG. 4, the arithmetic unit is repeatedly operable at leeast in a first and a second cycle. In the first cycle, the arithmetic unit is used in calculating only the total product of the first and the second numbers memorized in the respective registers 11 and 12. In the second cycle, the arithmetic unit is used as at least a part of the utilization device mentioned before and deals with the total product as the additional partial product supplied to the Wallace tree 14 through the different connection 29 to derive the afore-mentioned resultant sum which is now equal to twice the total product calculated in the first cycle.

It will now be appreciated that the different connection 29 delivers zero as the "addend" to the Wallace tree 14 during the first cycle. The "resultant sum" is got at an end of the first cycle as a sum of the total product and the zero. In any event, addition of either the zero or the total product is carried out in each of the first and the second cycles in a time interval for the multiplication process alone.

Figure 5:
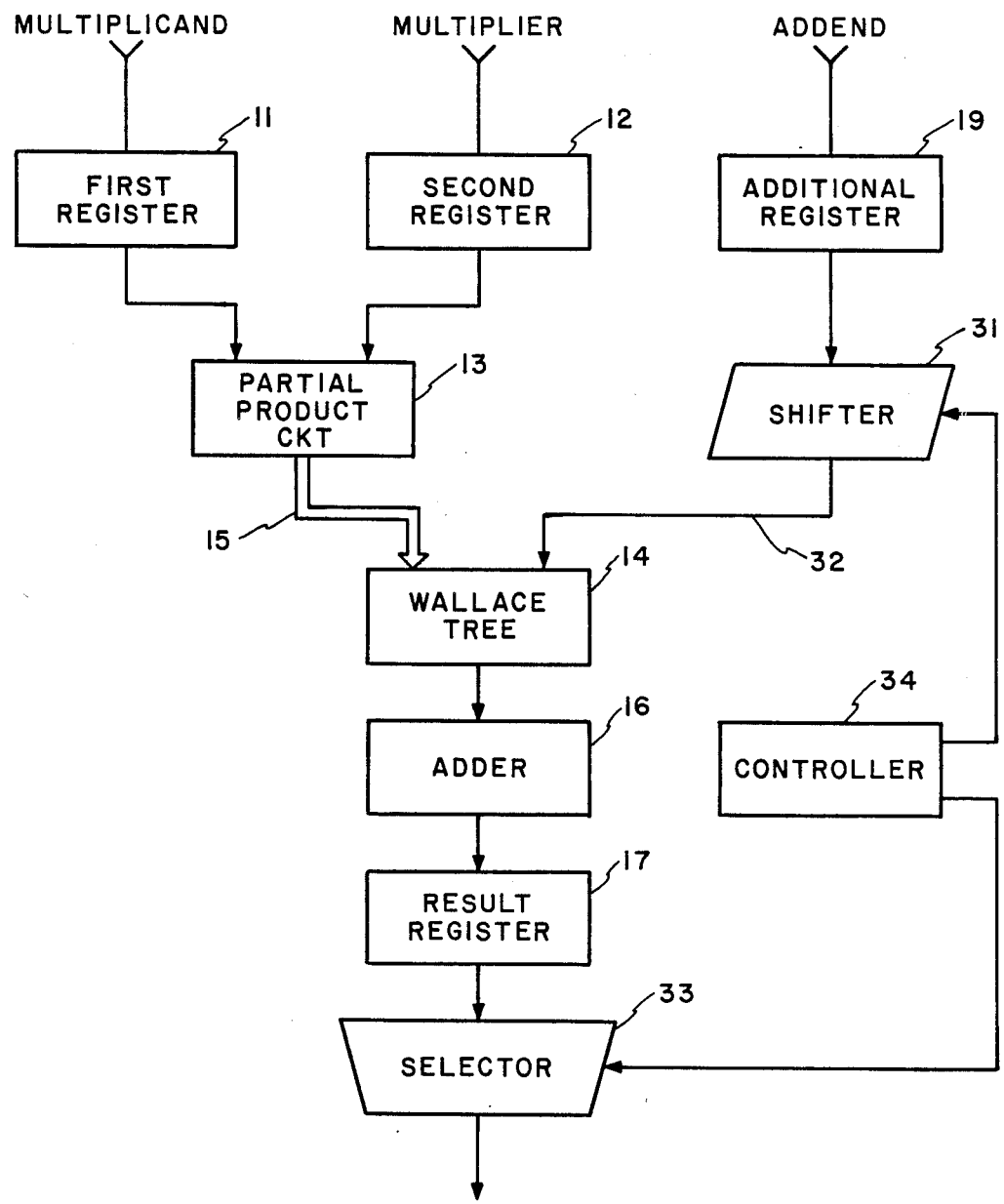
FIG. 5 is a block diagram of an arithmetic unit according to a fourth embodiment of this invention.

Referring to FIG. 5, the description will further proceed to an arithmetic unit according to a fourth embodiment of this invention. The arithmetic unit comprises similar parts which are again designated by like reference numerals and include the additional register 19. The third signal is delivered from the additional register 19 to the Wallace tree 14 through a shifter 31 and then through a connection 32. The resultant sum is delivered from the result register 17 to the utilization device through a selector 33. The shifter 31 and the selector 33 are controlled by a controller 34. Operation will be described in the following.

In the manner described before, it will be assumed tht the multiplicand an the multiplier have m and n bits. In this event, the total product has (m+n) bits. It will moreover be assumed that the addend has also (m+n) bits and that the resultant sum should have significant bits, (m+n+1) in number. It will additionally be assumed that each of the Wallace tree 14, the adder or totalizer 16, and the result register 17 is for [2(m+n)−1] bits. Responsive to weighting information which will shortly become clear and is supplied through a connection (not shown) for the addend represented by the third signal, the controller 34 controls the shifter 31 to give a controlled amount of shift to bits of the addend. At the same time, the controller 34 makes the selector 33 select the significant bits as a selected sum from the resultant sum in correspondence to the amount of shift.

Figure 6:
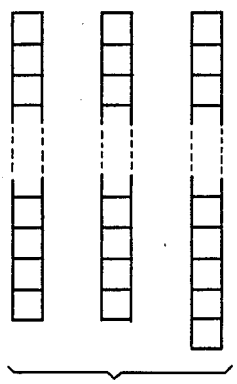
FIG. 6 shows bits of a product and an addend for use in describing operation of the arithmetic unit illustrated in FIG. 5.

Referring to FIG. 6, the total product has (m+n) bits in the manner illustrated along a top line. The addend has also (m+n) bits as depicted along a middle line. When the weighting information does not make the shifter 31 shift bits of the addend, the resultant sum may have (m+n+1) bits as shown along a bottom line. The selector 33 selects the resultant sum as it stands.

Figure 7:
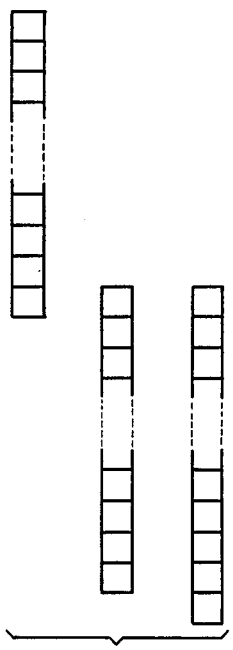
FIG. 7 shows different bits of the product and the addend.

Turning to FIG. 7, the total product has (m+n) bits in the manner depicted along a top line. It will now be surmised that the weighting information gives a higher weight to the addend than to the total product and indicates that a shift of a bits should be given to the addend towards the most significant bit. Controlled by the controller 34, the shifter 31 shifts bits of the addend leftwardly of the figure as exemplified along a middle line, where a is equal to [m+n]−1]. The resultant sum has 2(m+n) bits. Controlled by the controller 34, the selector 33 selects the selected sum as illustrated along a bottom line. More specifically, the selector 33 selects the a-th bit as counted from the least significant bit of the resultant sum and (m+n) bits which are more significant than the a-th bit. Stated otherwise, the selector 33 selects the significant bits as counted from the most significant bit of the resultant sum.

Figure 8:
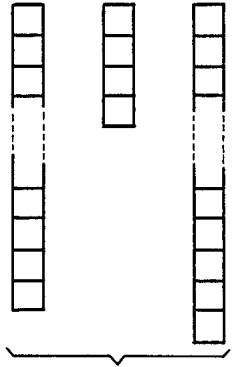
FIG. 8 shows further different bits of the product and the addend.

Further turning to FIG. 8, the total product has (m+n) bits in the manner shown along a top line. It will be surmised that the weighting information gives a lower weight to the addend than to the total product and indicates that a shift of b bits should be given to bits of the addend towards the least significant bit. Controlled by the controller 34, the shifter 31 shifts the addend rightwardly of the figure as exemplified along a middle line, where b is equal to [m+n)−4]. The resultant sum may hve (m+n+1) bits as depicted along a bottom line. In this event, the controller 34 makes the selector 33 produce the selected sum in the manner illustrated along the bottom line by selecting the resultant sum as it is.

Reviewing FIG. 5, it is possible to deliver the resultant sum from the adder or totalizer 16 to the selector 33 and thence to the result register 17. Under the circumstances, the result register 17 may be for the significant bits alone rather than for all bits of the resultant sum. A somewhat longer time interval, however, becomes unavoidable to get the selected sum due to an additional time interval which is mandatory for the selector 33 to select the selected sum from the resultant sum obtained from the adder 16.

It may be pointed out here that addition of an addend to a product of two numbers is used in various parts of an electronic digital computer. For example, division of a dividend N by a divisor D may be carried out as follows to get a quotient Q by resorting to floating point. By using an equation:

$$N/D = (N/D) \times (R_O/R_O) \times (R_1/R_1) \times \ldots \times (R_N/R_N),$$

where $R_O$ and so forth will be called zeroth through N-th variables, the zeroth through the N-th variables are selected so that an overall denominator of the right-hand side of the equation may converge to unity. On so selecting the variables, the arithmetic unit of this invention is effective. In other words, the arithmetic unit can shorten a time interval which is necessary to carry out the division. As other examples, it is known in mathetics to use a series in defining a function as, for example, trigonometric, exponential, and logarithmic functions. On calculating an approximate value for an argument by using a finite polynomial, the arithmetic unit of this invention is effective.

While this invention has thus been described in specific conjunction with a few preferred embodiments thereof, it will now be readily possible for one skilled in the art to carry this invention into effect in various other manners. For example, two or more additional registers may be used in FIG. 5 like in FIG. 3. Even in this event, the arithmetic unit can calculate the resultant sum in a time interval for only the multiplication process provided that the selector 33 is used for the resultant sum memorized in the result register 17.

What is claimed is:

1. An arithmetic unit comprising:
   a first regiser for memorizing a first signal representative of a first number originating outside said unit;
   a second register for memorizing a second signal representative of a second number originating outside said unit;
   a partial product circuit responsive to said first and said second signals for calculating a plurality of partial products for said first and said second numbers;
   a Wallace tree;
   first means for supplying said partial products from said partial product circuit to said Wallace tree;
   second means for supplying an addend to said Wallace tree as an additional partial product, said addend originating outside said unit;
   said Wallace tree being responsive to said plurality of partial products an said additional partial product for producing a plurality of tree outputs; and
   an adder for summing up said tree outputs into a resultant sum of a total product of said first and said second numbers plus said addend.

2. An arithmetic unit as claimed in claim 1, wherein said second means comprises:
   an additional register for memorizing a third signal representative of said addend; and
   a connection for supplying said third signal from said additional register to said Wallace tree as said addend.

3. An arithmetic unit as claimed in claim 1, wherein said second means comprises:
   a plurality of additional registers for memorizing a plurality of additional signals, respectively, each additional signal representing a summand; and
   connections for supplying the additional signals from the respective additional registers to said Wallace tree, the summands represented by the respective additional signals being used collectively as said addend.

4. An arithmetic unit as claimed in claim 1, wherein:
said second means comprises:
an additional register for memorizing a third signal representative of a third number; and
a shifter for giving a predetermined shift to said third number to produce said addend;
said arithmetic unit further comprising:
selecting means for selecting predetermined bits of said resultant sum as a selected sum; and
a controller for controlling said predetermined shift and said predetermined bits.

5. An arithmetic unit as claimed in claim 4, wherein said selecting means comprises:
a result register for memorizing said resultant sum; and
a selector controlled by said controller to select said selected sum from the resultant sum memorized in said result register.

6. An arithmetic unit as claimed in claim 4, wherein said selecting means comprises:
a selector controlled by said controller to select said selected sum from the resultant sum calculated by said adder; and
a result register for memorizing said selected sum.

* * * * *